United States Patent [19]
Karol

[11] 3,844,975
[45] Oct. 29, 1974

[54] THERMALLY AGED HYDRIDE BASED POLYMERIZATION CATALYST

[75] Inventor: Frederick J. Karol, Somerset, N.J.

[73] Assignee: Union Carbide Corporation, New York, N.Y.

[22] Filed: Nov. 10, 1972

[21] Appl. No.: 305,270

[52] U.S. Cl............ 252/430, 252/428, 252/431 R, 252/455 R, 252/458, 252/465, 260/94.9 D
[51] Int. Cl. ............................................ C08f 3/04
[58] Field of Search.... 252/430, 431 R, 428, 455 R, 252/458, 465

[56] References Cited
UNITED STATES PATENTS

| | | | |
|---|---|---|---|
| 3,013,002 | 12/1961 | Breslow et al.............. | 252/429 B X |
| 3,163,682 | 12/1964 | Walker et al............... | 252/431 P X |
| 3,185,718 | 5/1965 | Brown et al................ | 252/431 P X |
| 3,288,829 | 11/1966 | Wilkinson................... | 252/431 R X |

Primary Examiner—Patrick P. Garvin
Attorney, Agent, or Firm—James J. O'Connell

[57] ABSTRACT

Ethylene is homopolymerized, or copolymerized with other alpha olefins, with a catalyst comprising cyclopentadienyl chromium tricarbonyl hydride supported on activated $SiO_2$, $Al_2O_3$ or $SiO_2$—$Al_2O_3$ and thermally aged in an inert atmosphere.

The catalyst may be used to produce unsaturated polymers having a relatively low melt index.

8 Claims, No Drawings

THERMALLY AGED HYDRIDE BASED POLYMERIZATION CATALYST

BACKGROUND OF THE INVENTION

1. Field of the Invention

The invention relates to the catalytic polymerization of ethylene.

2. Description of the Prior Art

Some pi-bonded chromium compounds may be used, unsupported, as olefin polymerization catalysts, as disclosed for example in U.S. Pat. No. 3,379,706. The activity, as olefin polymerization catalysts, of some pi-bonded chromium compounds may also be generated or enhanced by using the compounds on inorganic oxide supports, as disclosed for example, in U.S. Pat. Nos. 3,123,571 and 3,157,712.

It has not been possible, however, prior to the present invention, to provide a means for using cyclopentadienyl chromium tricarbonyl hydride compounds as ethylene polymerization catalysts.

SUMMARY OF THE INVENTION

It has now been found that cyclopentadienyl chromium tricarbonyl hydride, supported on activated $SiO_2$, $Al_2O_3$ or $SiO_2$—$Al_2O_3$, may be used as an ethylene polymerization catalyst to produce unsaturated polymers having a relatively low melt index if the supported compound is thermally aged in an inert atmosphere prior to its use as an ethylene polymerization catalyst.

An object of the present invention is to provide a means for altering the characteristics, or active sites, for ethylene polymerization purposes, of supported cyclopentadienyl chromium tricarbonyl hydride so that the supported compound can be used as a catalyst to produce unsaturated polymers having a relatively low melt index.

Another object of the present invention is to provide a novel catalyst system for the polymerization of ethylene.

DESCRIPTION OF THE PREFERRED EMBODIMENT

It has now been found that the characteristics of cyclopentadienyl chromium tricarbonyl hydride, supported on $SiO_2$, $Al_2O_3$, or $SiO_2$—$Al_2O_3$, as an ethylene polymerization catalyst may be altered, so that all the supported compound may be used to produce unsaturated polymers having a relatively low melt index, by thermally aging the supported compound in an inert atmosphere.

Chromium Compound

The chromium compounds which are used in the present invention have the structure:

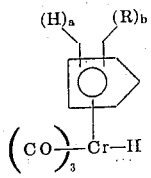

wherein R is a $C_1$ to $C_6$, inclusive, saturated or unsaturated hydrocarbon radical,
$a$ is an integer of 0 to 5, inclusive, $b$ is an integer of 0 to 5 inclusive, and $a + b = 5$.

The R groups include methyl, ethyl, allyl, propyl, isopropyl, n-butyl, isobutyl, n-pentyl and n-hexyl.

Inorganic Oxide Supported Organo Metallic Compound

The catalyst systems of the present invention are made from components which comprise an organometallic compound, the chromium hydride compound, supported on an activated support.

About 0.001 to 10 percent, or more, by weight of the organometallic compound is used on the support, based on the combined weight of the organometallic compound and the inorganic oxide support. The support thus comprises about 90 to 99.999 percent by weight of the composite catalyst, prior to the heat treatment thereof. The amount of the organometallic compound which can be deposited on the support varies, depending on the particular support being used, and the activation temperature of such support. Typically, about one fourth to one half of the amount of the organometallic compound that could be deposited on the support is used to facilitate introducing the compound into the reactors, but the extremes in amounts of from near zero to total saturation of the support can be used without adverse effect on final polymer properties.

The supports which may be used for the organometallic compounds are materials having a high surface area, that is, a surface area in the range of about 50 to about 1000 square meters per gram. The supports which may be used include silica and alumina, and mixtures thereof.

Because the organometallic compounds are sensitive to moisture, the catalyst support should be completely dried before it is brought into contact with the organometallic compound. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the adsorbed water from the support while at the same time avoiding such heating as will remove all of the chemically bound water from the support. The passage of a stream of dry inert gas through the support during the drying aids in the displacement of the water from the support. Drying temperature of from about 200°C. to 1,000°C. for a short period of about six hours or so should be sufficient if a well dried inert gas is used, and the temperature is not permitted to get so high as to completely remove the chemically bound hydroxyl groups on the surface of the support.

Any grade of support can be used but microspheroidal intermediate density (MSID) silica having a surface area of about 350 square meters per gram and a pore diameter of about 200 A., and intermediate density (ID) silica having a surface area of about 285 square meters per gram and a pore diameter of 168 A. are preferred. Other grades such as the G-951 silica and G-966 silica-alumina, as designated by W. R. Grace and Co. having surface areas of 700 and 500 square meters per gram, respectively, and pore diameters of 50–70 A. are also quite satisfactory. Variations in melt index control and in polymer productivity can be expected between different grades or types of supports.

The supported catalysts can be prepared by a slurry technique where the selected and properly dried support is added under conditions which exclude the presence of air and moisture to a solution containing the organochromium compound and solvent to form a slurry. The slurry may be stirred for a period of up to about four hours to obtain good adsorption of the organometallic compound on the support.

The supported catalyst can be used in slurry form, or as a semi-solid paste or as a dry free flowing powder. To form the paste or dry powder, the solvent can be filtered, drained or evaporated from the slurry under conditions which exclude oxygen and moisture to yield the desired form of the catalyst.

In some cases, dry supported catalyst may also be conveniently prepared in the absence of solvent by direct vapor deposition (sublimation) of selected organochromium compounds onto a dry support. This may be simply and conveniently accomplished by blending the organochromium compound and support under a dry, inert atmosphere, and then reducing the pressure to cause the organochromium compound to sublime and adsorb onto the support.

Thermal Aging of the Supported Organochromium Compound

After the organochromium compound is deposited on the support it is first dried to remove any solvent residues, and then it is thermally aged in accordance with the present invention. The thermal aging is conducted by heating the catalyst composition at a temperature of about 110° to 900°C., and preferably of about 300° to 700°C. for at least 0.1 hours, and preferably for about 0.5 to 3 hours. The thermal aging is conducted in an inert atmosphere. The inert atmosphere can be supplied by an inert gas such as nitrogen or argon.

The thermal aging of the composite catalyst is conducted for a period of time which is sufficient, at the selected aging temperature, to allow for the removal of at least some, and preferably all, of the organic ligands and the hydride hydrogen from the organochromium compounds. The ligands are thermally cleaved from the organochromium compounds during the heat treatment.

It is believed that the thermal aging at about 110° to about 300°C. removes the carbonyl (CO) ligands and the hydride hydrogen atoms from the compound. At thermal aging temperatures of about 300° to 700°C. or more, it is believed that the cyclopentadienyl radicals are removed from the compound. The use of the higher aging temperatures, particularly of ≥ 300°C. in the preparation of the active catalyst, tends to lead to the production, with such catalysts, of polymers which have lower melt indices and a higher unsaturation content, than are produced by the use of catalysts which are thermally aged at lower temperatures, i.e., 110°–<300°C.

After the thermal treatment of the composite catalyst it may be further treated with about 0.001 to 10 moles, per mol of chromium in composite catalyst, of one or more organoaluminum compounds which may be a trialkyl aluminum compound, an alkyl aluminum hydride compound and/or an aluminum alkoxide compound. The use of these organoaluminum compounds helps to increase the yield of polymer that may be obtained with the thermally aged catalysts of the present invention.

The trialkyl aluminum compounds and the alkyl aluminum hydride compounds have some structural similarities. In these compounds the alkyl group is a hydrocarbyl group which can contain from one to about 14 carbon atoms. Illustrative of such compounds are trimethylaluminum, triethylaluminum, diethylaluminum hydride, triisobutyl aluminum, tridecylaluminum, and tridodecylaluminum. They can be generically classed as compounds of the formula:

$$(Z)_z Al(H)_y$$

wherein Z is an alkyl group as defined above, z is an integer from 1 to 3 inclusive and y is an integer from 0 to 2 inclusive, with the proviso that the sum of y and z is 3. Where these compounds contain more than one Z group, such groups may be the same or different.

The aluminum alkoxide compounds have the general formula:

$$(Z')_x Al(OZ'')_w$$

in which x and w are each integers from 1 to 2, inclusive, and together total 3, and Z' and Z'' are the same or different hydrocarbyl groups containing from one to about 14 carbon atoms. Such aluminum alkoxide compounds would include diethyl aluminum methoxide, diethyl aluminum ethoxide, diethyl aluminum cyclohexyl methoxide, diethyl aluminum phenoxide and methyl diethoxy aluminum.

The $C_1$ to $C_{14}$ hydrocarbyl radicals in the organoaluminum compounds would include alkyl, aralkyl, aryl, alkaryl, alicyclic, bicyclic and similar hydrocarbon groups. Examples of such groups are methyl, ethyl, propyl, isopropyl, n-butyl, isobutyl, n-pentyl, isopentyl, t-pentyl, hexyl, cyclohexyl, 2-methylpentyl, heptyl, octyl, 2-ethylhexyl, cyclohexylmethyl, nonyl, decyl, undecyl, dodecyl, tridecyl, tetradecyl, benzyl, pinyl, pinylmethyl, phenethyl, p-methylbenzyl, phenyl, tolyl, xylyl, naphthyl, ethylphenyl, methylnaphthyl, dimethylnaphthyl, norbornyl, norbornyl methyl or any such similar hydrocarbyl groups.

The Monomers

The process of the present invention is used for the preparation of homopolymers of ethylene, and copolymers of ethylene with other alpha olefins. The alpha olefins which may be used for the preparation of copolymers in accordance with the present invention may be one or more alpha olefins containing 3 to about 8, inclusive, carbon atoms. These monomers may be mono-olefins or non-conjugated di-olefins.

The mono alpha olefins which may be copolymerized with ethylene would include propylene, butene-1, pentene-1, 3-methylbutene-1, hexene-1, 4-methylpentene-1, 3-ethylbutene-1, heptene-1, octene-1, decene-1, 4,4-dimethylpentene-1, 4,4-diethylenehexene-1, 3,4-dimethylhexene-1, 4-butyl-1-octene, 5-ethyl-1-decene, 3,3-dimethylbutene-1, and the like. Among the diolefins which may be used to form the ethylene copolymers are 1,5-hexadiene, dicyclopentadiene, ethylidene norbornene, and the like. These copolymerizable monomers may be used in any combination thereof with ethylene for the preparation of copolymers in the process of the present invention.

The Polymers

The polymers which are prepared in accordance with the teachings of the present invention are solid polymers which include materials which have densities of about 0.945 to 0.970, inclusive, and melt indices of from 0 (no flow) to about 30.

The polymers are unsaturated as evidenced by positive infrared analysis for unsaturation at $10.35\mu$ (which is indicative of internal unsaturation), $11.02\mu$ (which is indicative of vinyl unsaturation) and at $11.27\mu$ (which is indicative of pendant methylene unsaturation). The polymers display vinyl contents of about 0.2 to 2.0 vinyl groups per 1,000 carbon atoms. The preferred polymers are homopolymers of ethylene and copolymers containing at least 50 percent, and preferably at least 80 percent by weight of ethylene and up to 50 percent, and preferably up to 20 percent by weight of one or more other mono- and/or diolefins which may be interpolymerized therewith.

The Polymerization Reaction

After the thermally aged catalyst has been formed, the polymerization reaction is conducted by contacting the monomer charge, and substantially in the absence of catalyst poisons, with a catalytic amount of the catalyst at a temperature and at a pressure sufficient to initiate the polymerization reaction. If desired, an inert organic solvent may be used as a diluent and to facilitate materials handling.

The polymerization reaction is carried out at temperatures of from about 30°C. or less up to about 200°C. or more, depending to a great extent on the operating pressure, the pressure of the entire monomer charge, the particular catalyst being used and its concentration. The selected operating temperature is also dependent upon the desired polymer melt index since temperature is also a factor in adjusting the molecular weight of the polymer. Preferably, the temperature is from about 30°C. to about 100°C. in the conventional slurry or "particle forming" technique and from 100°C. to 200°C. in "solution forming" operations. The control of temperature in this process is desirable as hereinafter more fully described in providing various effects upon the molecular weight of the polymers as well as in controlling the phase in which they are made. As with most catalyst systems, higher polymerization temperatures produce lower weight average molecular weight polymers, and consequently polymers of higher melt index.

The pressure can be any pressure sufficient to initiate the polymerization of the monomer charge and can be from subatmospheric pressure, using an inert gas as a diluent to superatmospheric pressure of up to about 1,000,000 psig (pounds per square inch gauge), or more, but the preferred pressure is from atmospheric up to about 1,000 psig. As a general rule, a pressure of 20 to 800 psig is most preferred.

When an inert organic solvent medium is employed in the process of this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isopentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene, tetrachloroethylene, ortho-dichlorobenzene, and the like. Particularly preferred solvent media are cyclohexane, pentane, isopentane, hexane and heptane.

When it is preferred to conduct the polymerization to a high solids level as hereinbefore set forth, it is, of course, desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry system is of course dependent upon the particular solvent employed in the polymerization and its solution temperature for the polymer prepared. Consequently, in the "particle form" embodiment, it is most desirable to operate at a temperature which is lower than the normal solution temperature of the polymer in the selected solvent. For example, polyethylene prepared herein may have a solution temperature in cyclohexane of about 90°C., whereas in pentane its solution temperature may be about 110°C. It is characteristic of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperatures, the monomer is more soluble in the solvent medium, thus counteracting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than a 50 percent solids content, provided conditions of sufficient agitation are maintained. It is particularly preferable to operate the slurry process in the range of 30–40 weight percent of polymer solids.

Recovery of the polymer from the solvent medium is, in this embodiment, reduced to a simple filtration and/or drying operation and no efforts need be expended in polymer clean up and catalyst separation or purification. The residual concentration of catalyst in the polymer is so small that it can be left in the polymer.

Operating at temperatures higher than the solution temperature of the polymer in the selected solvent medium also can produce a high polymer solids content in the solution polymerization procedure. The temperature in this type of polymerization system must be sufficiently high to enable the solvent being used to dissolve at least 25–30 percent by weight of the polymer being produced. On the other hand, the temperature must be sufficiently low to avoid thermal destruction of the formed polymer and the particular catalyst employed. In general, for the various solvents and catalyst used, temperatures within the range of about 100°C. to about 200°C. and preferably about 120°C. to about 170°C. have been found to be generally optimum for the practice of such solution polymerization procedure. However, the particular polymer being produced also has a significant effect on the optimum polymerization temperature. For example, ethylene-propylene copolymers which may be produced by this process may be soluble in many of these organic solvents at relatively low temperatures even though such temperatures may not be useful for the optimum production of ethylene homopolymers.

In the present process the proportion of solvent to polymer by weight can range from 0.2 to 100 and can be as low as 0.1:1 or even less, thereby maintaining a very high catalyst productivity and efficiency of the system.

When the solvent serves as a principal reaction medium, it is, of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

The following Examples are designed to illustrate the present invention and are not intended as a limitation upon the scope thereof.

The analytical method used for determining unsaturation in the polymers produced in the examples disclosed below consisted of determining the optical density of the appropriate infrared bands and using the following equations:

% vinyl unsaturation = $(A_{11.02})$ $(7.8)/t$(mils)
% trans unsaturation = $(A_{10.35})$ $(11.1)/t$(mils)
% pendant methylene group = $(A_{11.27})$ $(9.13)/t$(mils)
% methyl = $(A_{7.27})$ $(33.8)/t$(mils)

where:
$A$ = absorbance
$t$ = thickness, in mils, of a sample of polymer in film form
vinyl groups/1,000 C atoms in polymer = % vinyl × 5.19
trans unsaturation/1,000 C atoms in polymer = % trans × 5.39
pendant methylene groups/1,000 C atoms in polymer = % pendant methylene × 5.39
methyl/1,000 C atoms in polymer = % methyl × 9.34

Density is determined by ASTM D-1505, with the test plaque being conditioned for one hour at 120°C. to allow it to approach equilibrium crystallinity.

Melt Index (MI) is determined by ASTM D-1238, with the polymer measured at 190°C., and the test values reported as decigrams per minute.

Flow Index (HLMI) is determined by ASTM D-1238 with the measurements taken while the polymer is subjected to a weight which is 10 times that used in the Melt Index test.

Flow Rate Ratio (FRR) = Flow Index/Melt Index

EXAMPLES 1-4

A. Preparation of Thermally Aged Catalyst
Four catalysts were prepared. To prepare each catalyst a 100 ml round bottom blask was fitted with a heating mantle, nitrogen purge and pyrometer and there were added thereto 0.8 gr of a support and 40 mg of unsubstituted cyclopentadienyl chromium tricarbonyl hydride dissolved in 2.0 ml of toluene. In each case the support was silica which had a surface area of about 285 square meters per gram and which had been activated at 600°C. for 18 hours. The system was then agitated for about 30 minutes to allow the chromium compound to become adsorbed on the support. The flask was heated to remove the toluene, and the remaining dry powder, which consisted of the organochromium compound adsorbed on the support, was thermally aged by being heated at 300° or 600°C. for 30 minutes. All the operations were conducted under an inert blanket of nitrogen gas.

After the thermal aging, the flask was cooled, 30 ml of n-hexane was added thereto by syringe and the contents transferred, under nitrogen, to a reactor for the desired polymerization, as described below.

Where an organometallic reducing agent was used, it was added to the thermally aged catalyst at this point.

B. Preparation of Control Catalyst
A control catalyst was prepared by depositing 40 mg of unsubstituted cyclopentadienyl chromium tricarbonyl hydride on 0.8 gr of silica. The silica had a surface area of about 285 square meters per gram and had been activated at 600°C. for about 18 hours. The adsorption of the organochromium compound on the support was accomplished in about 75–100 ml of dry, oxygen free n-hexane in an 8 oz. bottle. The organochromium compound was supplied as a solution in toluene (~20 mg/ml.). After stirring the admixture for about 30 minutes, to permit deposition of the organochromium compound on the support to take place, the contents were transferred to a reactor for the desired polymerization. The control catalyst was not thermally aged. The preparation of the control catalyst was conducted under an inert atmosphere of nitrogen.

C. Polymerization Reactions
The catalysts prepared in A and B above were used in five polymerization reactions. In each reaction ethylene was homopolymerized under slurry conditions by contacting the monomer with the catalyst in 500 ml of hexane in a one liter autoclave under nitrogen at 90°C. and under a total pressure of 200 to 400 psig. About 15 psig of $H_2$ was used in each reaction with the remainder of the pressure being supplied by the ethylene. The reactions were conducted for 30–60 minutes.

The heat aging temperature used for each catalyst employed in Examples 1–4; the reaction conditions employed with each such catalyst (pressure and $H_2/C_2H_4$ ratio); and the yield and melt index properties of the polymers made with catalysts are listed below in Table I.

Table II below additionally lists various microstructural properties of the polymers made with the thermally aged catalysts, i.e., melt index, unsaturation, and methyl content.

These results and data indicate that a useful catalyst, for ethylene polymerization reactions, is prepared, by thermally aging the supported organochromium compound as described above.

TABLE I

| Example | Aging Temp. °C. | $C_2H_4$ psi | $H_2/C_2H_4$ ratio | Reaction Time minutes | Yield gr. | MI dg/min. | HLMI dg/min. | HLMI/MI |
|---|---|---|---|---|---|---|---|---|
| Control | none | 385 | 0.039 | 60 | 0 | — | — | — |
| 1 | 300 | 350 | 0.043 | 60 | 148 | 0.28 | 10.7 | 38 |

TABLE I—Continued

| Example | Aging Temp. °C. | $C_2H_4$ psi | $H_2/C_2H_4$ ratio | Reaction Time minutes | Yield gr. | MI dg/min. | HLMI dg/min. | HLMI/ MI |
|---|---|---|---|---|---|---|---|---|
| 2 | 300[a] | 385 | 0.039 | 30–40 | 149 | 0.14 | 4.9 | 38 |
| 3 | 300[a] | 185 | 0.081 | 60 | 72 | 1.2 | 52 | 43 |
| 4 | 600 | 385 | 0.039 | 60 | 121 | N.F. | 1.0 | — |

N.F. = no flow or zero melt index
[a] = 0.25 moles triethyl aluminum added to the thermally aged catalyst prior to its contact with the ethylene.

TABLE II

| Example No. | MI dg/min. | Methyl Wt.% | /1000C | Vinyl Wt.% | /1000C | Trans-Internal Wt.% | /1000C | Pendant Methylene Wt.% | /1000C |
|---|---|---|---|---|---|---|---|---|---|
| 1 | 0.28 | 0.23 | 2.1 | 0.04 | 0.21 | 0.02 | 0.11 | 0.01 | 0.05 |
| 2 | 0.14 | 0.14 | 1.3 | 0.06 | 0.31 | 0.02 | 0.11 | 0.01 | 0.05 |
| 3 | 1.2 | 0.35 | 3.3 | 0.08 | 0.42 | 0.04 | 0.22 | 0.01 | 0.05 |
| 4 | NF | 0.19 | 1.8 | 0.20 | 1.0 | 0.02 | 0.11 | 0.01 | 0.05 |

EXAMPLES 5–7

A. Preparation of Thermally Aged Catalyst

Three catalysts were prepared. To prepare each catalyst, a 100 ml round bottom flask was fitted with a heating mantle, nitogren purge and pyrometer and there were added, in each preparation, 0.8 gr of a support and 40 mg of unsubstituted cyclopentadienyl chromium tricarbonyl hydride dissolved in 2.0 ml of toluene. The support was silica-alumunim which consisted of about 87 percent by weight of $SiO_2$ and about 13 percent by weight of $Al_2O_3$ and which had a surface area of about 529 square meters per gram, and which had been activated by heating at 500°C. for 18 hours. The system was agitated for about 30 minutes to allow the chromium compound to become adsorbed on the support. The flask was heated to remove the toluene and the remaining dry powder, which consisted of the organochromium compound adsorbed on the support, was thermally aged by being heated at 100°, 300° or 600° C. for 30 minutes. All the operations were conducted under an inert blanket of nitrogen gas.

After the thermal aging, the flask was cooled, 30 ml of n-hexane was added thereto by syringe and the contents transferred, under nitrogen, to a reactor for the desired polymerization, as described below.

B. Preparation of Control Catalysts

Two control catalysts were prepared by depositing, in each preparation, 40 mg of unsubstituted cyclopentadienyl chromium tricarbonyl hydride on 0.8 gr of silica-alumina. The silica-alumina support was the same as that prepared in A above. The adsorption of the organochromium compound on the support was accomplished in about 75–100 ml of dry, oxygen free n-hexane in an 8 oz. bottle. The organochromium compound was supplied as a solution in toluene (~20 mg/ml.) After stirring the admixture for about 30 minutes to permit deposition of the organochromium compound on the support to take place, the contents were transferred to a reactor for the desired polymerization. The control catalysts were not thermally aged. The preparation of the control catalysts was conducted under an inert atmosphere of nitrogen.

C. Polymerization Reactions

The catalysts prepared in A and B above were used in five polymerization reactions. In each reaction ethylene was homopolymerized under slurry conditions by contacting the monomer with the catalyst in 500 ml of hexane in a one liter autoclave under nitrogen at 90°C. and under a total pressure of 400 psig. About 15 psig of $H_2$ was used in each reaction, with the remainder of the pressure being supplied by the ethylene. The $H_2/C_2H_4$ ratio in each experiment was 0.039. The reactions were conducted for 60 minutes.

The thermal aging temperature used for each catalyst employed in Examples 5–7; and the yield and melt index properties of the polymers made with the catalysts are listed below in Table III.

Table IV below additionally lists various microstructural properties of the polymers made with the thermally aged catalysts, i.e., melt index, unsaturation and methyl content.

These results and data indicate that a useful catalyst, for ethylene polymerization reactions, is prepared, by thermally aging the supported organochromium compound as described above.

TABLE III

| Example | Aging Temp. °C. | Yield gr. | MI dg/min. | HLMI dg/min. | HLMI/ MI |
|---|---|---|---|---|---|
| Control | none | 0 | — | — | — |
| Control | none[a] | 0 | — | — | — |
| 5 | 100 | 0 | — | — | — |
| 6 | 300 | 75 | N.F. | 1.2 | — |
| 7 | 600 | 65 | N.F. | N.F. | — |

N.F. = no flow or zero melt index
[a] = 0.25 moles triethyl aluminum added to the supported chromium compound prior to its contact with the ethylene.

TABLE IV

| Example No. | MI dg/min. | Methyl Wt.% | /1000C | Vinyl Wt.% | /1000C | Trans-Internal Wt.% | /1000C | Pendant Methylene Wt.% | /1000C |
|---|---|---|---|---|---|---|---|---|---|
| 6 | N.F. | 0.11 | 1.0 | 0.04 | 0.21 | 0.02 | 0.11 | 0.01 | 0.05 |
| 7 | N.F. | 0.17 | 1.6 | 0.38 | 2.0 | 0.04 | 0.22 | 0.01 | 0.05 |

EXAMPLES 8–9

A. Preparation of Thermally Aged Catalyst

Two catalysts were prepared. To prepare each catalyst a 100 ml round bottom blask was fitted with a heating mantle, nitrogen purge and pyrometer and there were added in each preparation, 0.8 gr of the support used in Examples 1–4 and 40 mg of unsubstituted cyclopentadienyl chromium tricarbonyl hydride dissolved in 2.0 ml of toluene. The system was stirred for about 30 minutes to allow the chromium compound to become adsorbed on the support. The flask was heated to remove the toluene, and the remaining dry powder, which consisted of the organochromium compound adsorbed on the support, was thermally aged by being heated at 300° or 600°C. for 30 minutes. All the operations were conducted under an inert blanket of nitrogen gas.

After the thermal aging, the flask was cooled, 30 ml of n-hexane was added thereto by syringe and the contents transferred, under nitrogen to a reactor for the desired polymerization, as described below.

B. Polymerization Reactions

The catalysts prepared in A above were used in two polymerization reactions. In each reaction ethylene was copolymerized with 17 grams of propylene under slurry conditions by contacting the monomers with the catalyst in 500 ml of hexane in a one liter autoclave under argon at 90°C. and under a total pressure of 300 psig. About 15 psig of $H_2$ was used in each reaction with the remainder of the pressure being supplied by the ethylene. The reactions were conducted for 60 minutes.

The heat aging temperature used for each catalyst employed in Examples 8–9; and the yield and melt index properties of the polymers made with the catalysts are listed below in Table V.

Table VI below additionally lists various microstructural properties of the polymers made with the thermally aged catalysts i.e., melt index, unsaturation and methyl content.

These results and data indicate that a useful catalyst, for ethylene copolymerization reactions, is prepared, by thermally aging the supported organochromium as described above.

TABLE V

| Example No. | Aging Temp. °C. | Yield gr. | MI dg/min. | HLMI dg/min. | HLMI/MI |
|---|---|---|---|---|---|
| 8 | 300 | 46 | 10 | 360 | 36 |
| 9 | 600 | 126 | 0.31 | 31 | 100 |

TABLE VI

| Example No. | Aging Temp °C. | MI dg/min | Methyl | | Vinyl | | Trans-Internal | | Pendant Methylene | |
|---|---|---|---|---|---|---|---|---|---|---|
| | | | Wt.% | /1000C | Wt.% | /1000C | Wt.% | /1000C | Wt.% | /1000C |
| 8 | 300 | 10 | 0.92 | 8.6 | 0.06 | 0.31 | 0.03 | 0.16 | 0.04 | 0.20 |
| 9 | 600 | 0.31 | 1.45 | 13.5 | 0.24 | 1.3 | 0.02 | 0.11 | 0.11 | 0.59 |

EXAMPLE 10

A catalyst was prepared by depositing 40 mg of unsubstituted cyclopentadienyl chromium hydride on 0.4 grams of magnesium oxide support as disclosed above. The support had a surface area of about 50–100 square meters per gram and had been activated by being heated at 600°C. for about 18 hours. The supported chromium compound was not thermally aged. The supported chromium compound was then used as a catalyst in an attempt to homopolymerize ethylene as disclosed in Examples 5–7. No polymer was obtained after one hour of reaction time.

What is claimed is:

1. An olefin polymerization catalyst which is prepared by
depositing catalytically effective quantities of at least one chromium compound having the structure

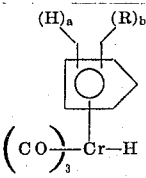

wherein R is a $C_1$ to $C_6$, inclusive, hydrocarbon radical, $a$ is an integer of 0 to 5, inclusive, $b$ is an integer of 0 to 5, inclusive, with the proviso that $a + b = 5$,
on an activated inorganic oxide support selected from the group consisting of silica, alumina and mixtures thereof, and
heating the deposited chromium compound at a temperature of about 110° to 900°C. in an inert atmosphere for a period of time sufficient to allow for the removal of at least some of the ligands from said chromium compound.

2. A catalyst as in claim 1 in which said support has a surface area of about 50 to 1,000 square meters per gram.

3. A catalyst as in claim 2 which contains 0.001 to 10 percent by weight of said chromium compound and 99.999 to 90 percent by weight of said support prior to the heating of said catalyst.

4. A catalyst as in claim 3 which is prepared by depositing cyclopentadienyl chromium tricarbonyl hydride on activated silica and heating the deposited chromium compound at 300° to 700°C. for 0.5 to 3 hours.

5. A catalyst as in claim 4 which has been treated with 0.001 to 10 mols of organoaluminum compound per mol of chromium compound after heating of the supported chromium compound, said organoaluminum compound having either the structure

wherein Z is a $C_1$ to $C_{14}$ hydrocarbyl group, $z$ is an integer from 1 to 3, inclusive, and $y$ is an integer from 0 to 2, inclusive, with the proviso that $y + z = 3$, or the structure

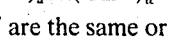

wherein Z' and Z'' are the same or different $C_1$ to $C_{14}$ hydrocarbyl groups, and $x$ and $w$ are each integers of 1 or 2, with the proviso that $x + w = 3$.

6. A catalyst as in claim 5 in which said organoaluminum compound is a trialkyl aluminum compound.

7. A catalyst as in claim 6 in which said aluminum trialkyl compound is aluminum triethyl.

8. A catalyst as in claim 3 which is prepared by depositing cyclopentadienyl chromium tricarbonyl hydride on activated silica-alumina and heating the deposited chromium compound at 300° to 700°C. for 0.5 to 3 hours.

* * * * *